United States Patent [19]

Kojima et al.

[11] 4,447,679
[45] May 8, 1984

[54] SUBSCRIBER LINE TESTING SYSTEM

[75] Inventors: Takafumi Kojima, Yokohama; Shigeru Yoshida, Kodaira; Masayuki Mizoguchi, Tokorozawa, all of Japan

[73] Assignees: Hitachi, Ltd.; Nippon Telegraph & Telephone Public Corporation, both of Tokyo, Japan

[21] Appl. No.: 360,847

[22] Filed: Mar. 22, 1982

[30] Foreign Application Priority Data

Mar. 23, 1981 [JP] Japan .................................. 56-40347

[51] Int. Cl.³ .......................... H04B 3/46; H04M 3/30
[52] U.S. Cl. ............................................ 179/175.3 R
[58] Field of Search ..................... 179/175.3 R, 175.25, 179/175.3 F, 18 A

[56] References Cited

U.S. PATENT DOCUMENTS 4,076,971 2/1978 Mukaemachi et al. ...... 179/175.3 R

Primary Examiner—Stafford D. Schreyer
Attorney, Agent, or Firm—Antonelli, Terry & Wands

[57] ABSTRACT

A testing system connects a subscriber line to be tested by way of a semiconductor switch of a type driven by a constant current to a test equipment to test a subscriber line and a terminal equipment. The test system includes a compensation circuit having means for measuring a constant current component contained in a current flowing through the semiconductor switch into a test line, and means for drawing a constant current component to drive the switch through the test line on the basis of the measuring result to supply the current component obtained by subtracting the constant current component from the current flowing through the test line to the testing equipment.

12 Claims, 6 Drawing Figures

SUBSCRIBER LINE TESTING SYSTEM

The present invention relates to a testing system for a telephone exchange in which a subscriber line is coupled through a leading-in switch with test equipment to test the subscriber line and terminal equipment connected to the subscriber line. More particularly, the present invention relates to a testing system for testing in such a system by using semiconductor switches of the constant current drive type as the leading-in switches.

In testing the subscriber lines in an existing telephone exchange, mechanical switches, such as relay contacts, are provided as the test leading-in switches in the subscriber's circuits. By selectively operating the switches, a desired subscriber line is connected to the test equipment. With this connection, the current flowing through the subscriber line is measured for detecting the occurrence of a fault in the subscriber line. This testing system is advantageous in that the test is easy, but disadvantageous from the point of view of reducing the size, cost and power consumption of the number of subscriber's circuits installed. With remarkable advancement of semiconductor integrated circuit technology, an attempt has been made to fabricate the subscriber's circuit and the space-division network by the use of such semiconductor technology. However, the use of the mechanical switches for the test leading-in switches hinders the fabrication of the subscriber's circuits in a monolithic fashion. For this reason, it has been impossible to pack the subscriber's circuits in a high density and to reduce the power consumption of the circuits. For this background reason, the advent of subscriber line testing systems which are easy to be reduced in size and in manufacturing cost has been a continuing objective of the industry.

There has been proposed an approach in which semiconductor switches of four or more layers, for example, thyristors, are used for the leading-in switches for the subscriber line test thereby realizing the desired size reduction and cost reduction, and the high density packaging which has been the objective of design efforts. In the approach using thyristors, however, a gate drive current must be fed to the thyristor after the switch is closed. Since the thyristor has a self-holding function, the thyristor can self-hold its switching state by the current flowing through the switch even if the gate drive current is stopped after the thyristor conducts, that is, after the switch is closed. However, when the current flowing into the switch is extremely small, as in the case of measuring insulating resistance, or when the direction of the current flowing into the switch is inverted, the switch is opened if the gate drive current is stopped. For holding the on-state of the switch when the current flowing into the switch is extremely small or the switch current is inverted in its direction of conduction, the gate drive current of the switch must be fed to the switch continuously after the switch is closed. Therefore the gate drive current after the switch is closed, flows into the speech path or the test loop. This creates a serious problem in the subscriber line test.

The problems of tests affected by the gate driving current depend on the magnitude of the latter. Mainly, difficulties are encountered in the case of (1) measurement of insulation resistance and (2) measurement of the external voltage.

In the measurement of the insulation resistance of a subscriber line, a measuring circuit composed of a cell, a D.C. ampere meter and the like is connected to the connection terminals of the semiconductor switch to feed a current through the semiconductor switch to the subscriber line to be tested. On the basis of the relationship between the voltage and the current available from the measuring circuit, it is primarily determined whether there is an imperfection in the insulation of the subscriber line. In this connection, it should be noted that the current available from the measuring terminals semiconductor switches corresponds to the sum of the inherent measuring current providing a measure of the insulation resistance and the gate driving current introduced to the speech channel and hence to the test loop. Thus, it is evident that the measuring result provides a smaller resistance than the actual one. If the gate drive current is always constant independently of partial dispersion, it is easy to obtain a true value by correcting the measuring results. Actually, however, the gate drive current is not constant because there is necessarily a variation in constants of the parts. As a result, the measuring result possibly has a great error or the measurement is almost impossible.

For example, when the gate drive current of the thyristor is turned into a leakage resistance, the gate current is approximately 0.05 to 1 mA, although this depends on the gate sensitivity of the switch. When the thyristor is used as a switch, with a minimum, or single stage connection, the leakage resistance is $50/2\times(0.05$ to $1)=500$ to 25 kilo ohms when the power source is 50 V. This value makes it impossible to measure the insulation resistor of several hundreds kilo ohms to several mega ohms coupled in parallel.

In measuring the external current, an ammeter is connected in series to the line, through the switch. The power line contact, battery contact or the like is checked with an indication by the ammeter. Also in this case, the external current measurement is impossible since the gate drive current is not constant because of the presence of the constant variation of the parts, as in the measurement of the insulation resistance.

As described above, in the telephone exchange system using semiconductor switch elements of the constant current drive type, it is difficult to conduct a subscriber line test, such as the test for insulation resistance and the external current measurements.

Accordingly, an object of the present invention is to provide a subscriber line test system capable of producing a test at a high accuracy which is suited for reducing the size and cost of a telephone exchange system.

Another object of the present invention is to provide a subscriber line test system with a low power consumption and high density package.

Another object of the present invention is to provide a subscriber line test system with a reduced measuring time and a high reliability.

To achieve the above objects, in accordance with the present invention, a desired subscriber line to be tested is connected to test equipment through a test line and a leading-in switch provided as a semiconductor switching element of the constant current drive type. Then, a constant current flowing through the test line is measured and only the measuring current flowing through the subscriber line to be tested is fed to the test equipment by drawing the constant current which serves to drive the leading-in switch by means of a compensation circuit which draws the constant current flowing through the test line.

Figure 1:
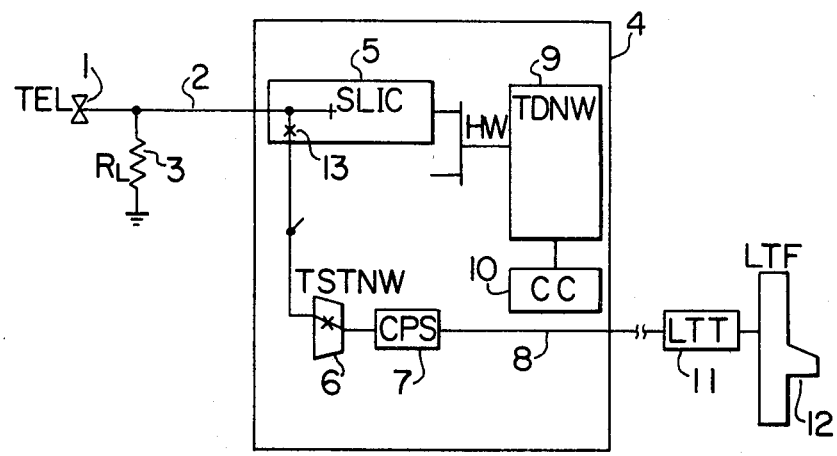
FIG. 1 shows a circuit diagram of an embodiment of a test system according to the present invention.

An outline of a subscriber line test system according to the present invention will be described. In FIG. 1, reference numeral 1 designates a telephone set; 2 a subscriber line; 3 an insulation resistance of the subscriber line; 4 a telephone exchange; 5 a subscriber's circuit; 6 a test network; 7 a compensation circuit; 8 a test line; 9 a time division network; 10 a control unit; 11 a subscriber line test trunk; 12 a subscriber line test equipment; 13 a test leading-in switch.

In FIG. 1, for testing the subscriber line 2, a specific test leading-in switch 13 and a switch in the test network 6, which are specifically related to a subscriber line to be tested, are selectively driven. Then a current corresponding to a gate current for driving the test leading-in switch 13 is drawn through the test line 8 by a constant current leading-in circuit in the compensation circuit 7. All of the undesirable characteristics of the test leading-in switch 13 are corrected by the compensation circuit 7, so that the subscriber line test equipment 12 can test the subscriber line through the line test trunk 11, as in the conventional test of the subscriber line in the telephone exchange. In other words, by using the compensation circuit 7, the subscriber line test in various types of telephone exchange systems may be performed by conventional test equipment.

Figure 2:
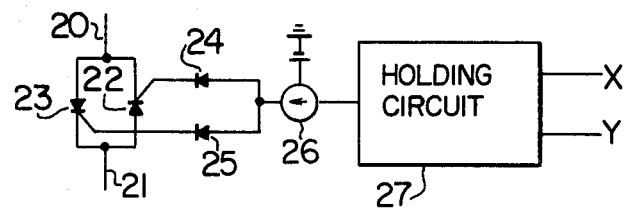
FIG. 2 shows a circuit diagram of one crosspoint of a semiconductor switching element used for a leading-in switch exclusively used for testing according to the present invention.
Figure 3:
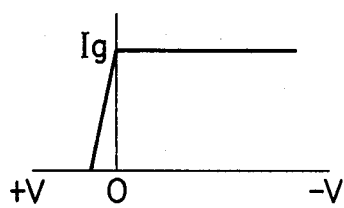
FIG. 3 shows a graphical representation of a relationship between a gate current vs. a cathode potential of a crosspoint thyristor.

FIG. 2 shows an example of the test leading-in switch 13 shown in FIG. 1. Specifically, FIG. 2 shows a circuit diagram showing a crosspoint (of only one of the line pair) of a semiconductor switch of the bidirectional type. In the circuit, reference numerals 20 and 21 represent incoming and outgoing test lines, respectively; 22 and 23 crosspoint thyristors; 24 and 25 gate reverse blocking diodes for the thyristors 22 and 23; 26 a constant current circuit for supplying the gate current Ig necessary for driving the crosspoint thyristors 22 and 23; 27 a holding circuit for holding a constant current circuit 26 when the switch is closed by selecting the coordinates in an orthogonal coordinate system. The relationship between the gate current Ig of the test leading-in switch 13 and the cathode potential V of each of the thyristors 22 and 23 is illustrated in FIG. 3. As shown in FIG. 3, the characteristic of the constant current circuit 26 is such that the gate current Ig reaches a constant current region when the cathode potential of each of crosspoint thyristors 22, 23 becomes 0 V.

Figure 4:
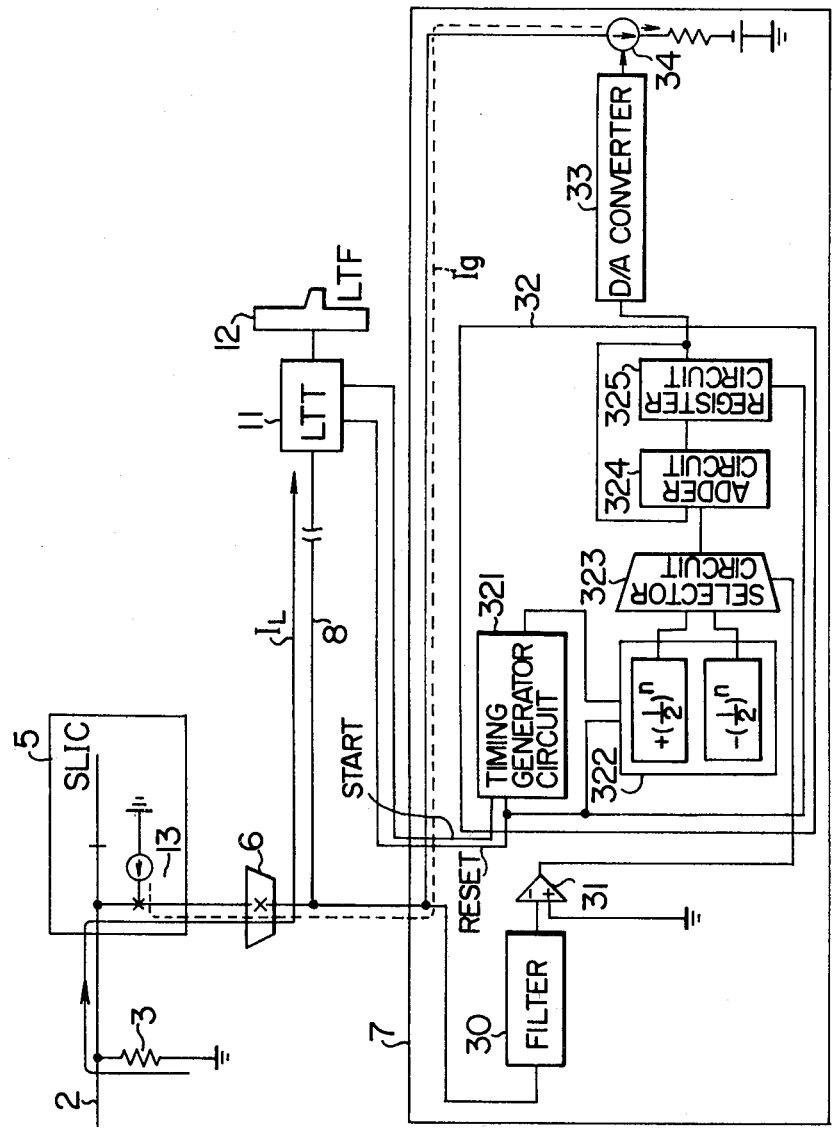
FIG. 4 is an explanatory diagram of an embodiment of a compensation circuit when the present invention is applied for an insulation resistance measurement.

A circuit arrangement and an operation of a correction circuit according to the present invention will be described referring to FIG. 4. In FIG. 4, to avoid the duplication of description, like symbols are used for designating like portions in FIG. 1. As in the case of the FIG. 1, only one of the subscriber line pair is tested. In the compensation circuit 7 of FIG. 4, a reference numeral 30 denotes a filter; 31 a comparator for checking whether or not the potential on the test line 8 reaches zero potential; 32 a control circuit for controlling the drawn current until the potential of the test line 8 reaches the zero potential; reference numerals 321 to 325 forms the control circuit 32; and a reference numeral 321 denotes a timing generator circuit; 322 a counter circuit, 323 a selector circuit; 324 an adder circuit; 325 a register circuit; 33 a digital to analog (D/A) converter for converting a control signal from the control circuit 32 into an analog signal; 34 a constant current leading circuit for drawing or leading out the current from the test line 8 according to a signal from the D/A converter 33. Ig designates a gate current for driving the test leading-in switch 13 and $I_L$ a measuring current flowing through the insulating resistor.

The operation of the circuit in FIG. 4 will be described. A control circuit (not shown) selectively drives the leading-in switch 13 and the test network 6 so that a subscriber line 2 to be measured is coupled with the subscriber line test equipment 12 and the compensation circuit 7. As a result of the connection, a measuring current $I_L$ flows through a route including ground—insulation resistor 3—subscriber line 2—test leading-in switch 13—test network 6—test trunk 11—subscriber line test equipment 12 in this order. The gate current Ig flows out of the constant current circuit 26 of the test leading-in switch 13 into the test network 6 and the constant current leading circuit 34, but does not flow into the subscriber line test equipment 12. A procedure for leading the gate current Ig into the constant current leading circuit 34, will be described.

As shown in FIG. 3, a relationship between the gate current Ig of the test leading-in switch 13 and the switch cathode potential V is such that when the cathode potential reaches 0 V, the gate current Ig settles down to be constant. In the compensation circuit 7, the potential on the test line 8 and zero potential are compared with each other by the comparator 31 through the noise damping filter 30. By the control circuit 32, on the basis of the output signal of the comparator circuit 31, the digital signal is incremented so as to increase the drawing current of the constant current drawing circuit 34 when the potential on the test line 8 is positive and is decremented so as to decrease the drawing current when the potential on the test line 8 is negative. These incrementing and decrementing operations of the digital signal are repeated until the potential on the test line 8 reaches to zero potential.

Next, the operation of the control circuit 32 will be explained in detail hereinafter.

Before the starting of the test, a control circuit (not shown) selectively drives the leading-in switch 13 and the test network 6 so that a subscriber line 2 to be tested is coupled with the compensation circuit 7 through the test line 8. At this time, the test equipment 12 is not coupled with the test line 8. A reset signal from the outer subscriber line test trunk 11 is received by the control circuit 32, and the counter circuit 322, the timing generator circuit 321 and the register circuit 325 are initially reset. Then, in the timing generator circuit 321 clock pulses are generated by a start signal from the subscriber line test trunk 11, and bit signals indicating $+(\frac{1}{2})^n$ and $-(\frac{1}{2})^n$ ($n=1, 2, 3, \ldots$) are successively generated on the basis of the clock pulses by means of the counter circuit 322, where n is determined by the relation between a test precision and a measured time and e.g. integer 1 to 10.

When the electric potential of the test line 8 is positive, the output of the comparator 31 becomes "zero" and the control signal $+(\frac{1}{2})^n$ of the counter circuit 322 is selected by the selector circuit 323.

On the other hand, when the electric potential of the test line 8 is negative, the output of the comparator 31 becomes "1" and the control signal $-(\frac{1}{2})^n$ of the counter circuit 322 is selected by the selector circuit 323.

In the adder circuit 324 the selected control signal is added to another control signal stored in the register circuit 325 at the former timing, and then the added value is stored in the register circuit 325. Thus, when the electric potential of the test line 8 is positive, the signal of the register circuit 325 comes near to "1", and the drawing current is increased. And, when the electric potential of the test line 8 is negative, the signal of the register circuit 325 comes near to "0", and the drawing current is decreased. Further, when the signal of the register circuit 325 is "0", the drawing current is set to be "zero". And when the signal of the register circuit 325 is "1", the drawing current is set to be "1 mA" (Ig<1 mA). This operation is repeated ten times (n=1~10), and the electric potential of the test line 8 comes near to "zero" potential unlimitedly.

That is, for example, assuming that the electric potential of the test line 8 is positive at the time of the timing when n=1, 2, 3, 6, 7, 9, and 10, and the electric potential of the test line 8 is negative at the time of the timing when n=4, 5 and 8, the drawing current increases and decreases repeatedly as shown in the example of $$\frac{1}{2}+\frac{1}{4}+\frac{1}{8}-\frac{1}{16}-\frac{1}{32}+\frac{1}{64}+\frac{1}{128}-\frac{1}{256}+$$

$$\frac{1}{512}+\frac{1}{1024},$$

and consequently the electric potential of the test line 8 comes near to "zero" potential unlimitedly.

In this way, the current corresponding to the gate current Ig flowing into the test line 8 is drawn into the constant current drawing circuit 34, thereby allowing only the measuring current $I_L$ to flow into the subscriber line test equipment 12.

The forward voltage drops across the test leading-in switch 13 and a switch in the test network 6 reduce a voltage applied across the insulation resistor 3. A decrement $\Delta I_L$ of the measuring current resulting from the reduction of the voltage across the resistor 3 is corrected in the control circuit 32 such that (Ig-$\Delta I_L$). Through the correction, the drawn current in the constant current drawing circuit 34 is (Ig-$\Delta I_L$).

Figure 5:
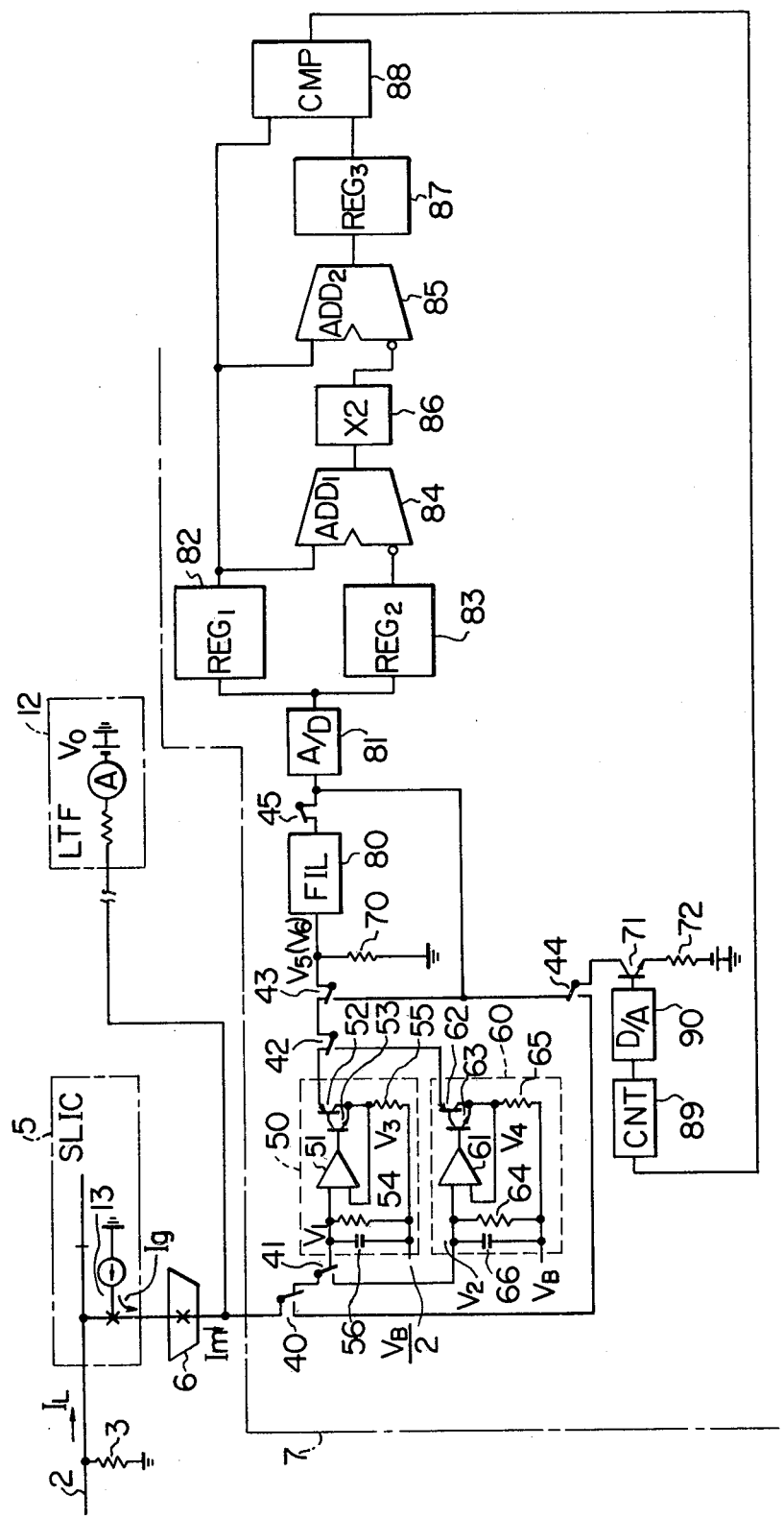
FIG. 5 is a circuit diagram of another embodiment of a compensation circuit according to the present invention.

Another embodiment of a compensation circuit according to the present invention will be described referring to FIG. 5. For simplicity of the explanation, like reference numerals are used to designate like portions in FIG. 4. In FIG. 5, reference numerals 40 to 50 in the compensation circuit 7 designate relay switches; 50 and 60 power source circuits of two types, a $V_B/2$ and a $V_B$, for introducing a current from the subscriber line 2 into the compensation circuit; 70 a resistor for converting the current introduced from the subscriber line into a voltage; 71 and 72 a transistor and a resistor, which cooperatively constitute a constant current circuit for drawing a gate current Ig.

Reference numeral 80 designates a filter for damping noise induced on a test line, and 81 an analog to digital (A/D) converter for converting a voltage produced across the resistor 70 into a digital signal. The output signal from the converter circuit 81 is stored in register circuits 82 and 83. These signals from the memory circuits are arithmetically processed by adder circuits 84 and 85, a doubling circuit 86, a register circuit 87, and a comparator 88. On the basis of the result of the processing, a control circuit 89 produces a signal for controlling the drawing current. The control signal is converted into an analog signal by a digital to analog (D/A) converter circuit 90 by which the base potential of a transistor 71 is controlled. In the power source circuits 50 and 60, reference numerals 51 and 61 are amplifiers, 52, 53, 62, 63 transistors, 54, 55, 64 and 65 resistors, and 56 and 66 capacitors.

Figure 6:
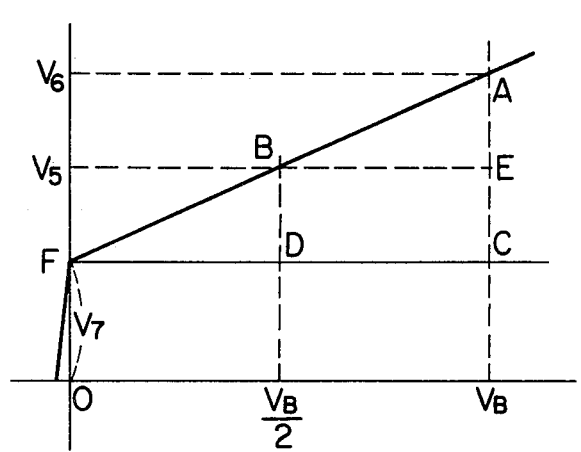
FIG. 6 is a graphical representation useful in explaining the way of an operation in FIG. 5.

The arithmetic operation in the compensation circuit 7 in FIG. 5 will be described referring to FIG. 6, which illustrates a graph describing a principle of the measurement.

For measuring the insulation resistance 3 of the subscriber line 2 through the test leading-in switch 13 coupled with the subscriber line 2, the gate current Ig of the leading-in switch 13 is drawn into the compensation circuit 7 to feed only the measuring current $I_L$ flowing through the insulation resistor 3 to the test equipment 12.

If it is assumed that the measuring power source voltage in the test equipment 12 is a known value Vo, a value on a scale of an ammeter A is $I'_L$, a gate current of the leading-in switch 13 is Ig, a full current value flowing through the test line 8 is Im, and an insulation resistor is $R_L$, we have $$I_L = Im - Ig$$

$$R_L = Vo/I'_L$$

If the gate current Ig is fully drawn by the compensation circuit 7, the current $I_L$ flowing through the insulation resistor 3 and the scale value $I'_L$ pointed to by the ammeter A are equal to each other. As a result, it is possible to measure the insulation resistance 3 of the subscriber line 2 by a value indicated by the ammeter A in the test equipment 12.

The compensation circuit 7 for drawing the gate current Ig controls the relay switches to selectively connect to the test line 8 and $V_B/2$ system power source circuit 50 or the $V_B$ system power source circuit 60, whose potential states are related in the ratio 1:2. With this connection, the currents Im1 and Im2 corresponding to the potentials of the power source are introduced into the compensation circuit 7. Input voltages V1 and V2 to the amplifiers 51 and 61, that is, voltages across the resistors 54 and 64, are given by the following equations:

$$V1 = V_B/2 - Im1 \times R54$$

$$V2 = V_B - Im2 \times R64,$$

where resistances of the resistors 54 and 64 are R54 and R64. In this circuit arrangement, the amplifiers 51 and 61 function as voltage followers, and are coupled at the output with the combinations of the transistors 52 and 53, and 62 and 63, and the resistors 55 and 65, as shown. At this time, the emitter potentials V3 and V4 of the transistors 53 and 63, if R54=kR55 and R64=kR65, are respectively expressed by $$V1 = k1 \times V3$$

$$V2 = k1 \times V4.$$

In other words, the current Im1 flowing through the resistor 54 and the current Im'1 flowing through the resistor 55, and the current Im2 flowing through the resistor 64 and the current Im'2 flowing through the resistor 65 are related in the following way:

$$Im'1 = k2 \times Im1$$

$$Im'2 = k2 \times Im2.$$

It is assumed that voltages V5 and V6 produced across the resistor 70 by the flow of the current values Im'1 and Im'2 are V5 and V6, respectively. The voltages V5 and V6 are converted into digital signals by the A/D converter circuit 81. The digital signals representative of the voltages V5 and V6 are temporarily stored in the registers 82 and 83. The measured values V5 and V6 read out from the registers 82 and 83 are subjected to a calculation to obtain a voltage caused by the current Ig of the switch 13 which is performed by the combination of the adders 84 and 85, and the doubling circuit 86. This operation is executed on the basis of the principle illustrated in FIG. 6. When the cathode potential of the switch 13 is set at 0 V, only the gate current as the constant current component flows. To obtain the voltage V7 under this condition, a feature that only the measuring current $I_L$ is changed by the voltage in the power source circuit is utilized. From the characteristic shown in FIG. 6, the following relation results $$|AE|:|AC| = |CD|:|CF| = V_B/2 : V_B = 1:2.$$

Since $|AE| = V6-V5$, and $|AC| = 2(V6-V5)$, the voltage V7 caused by the gate current Ig of the switch 13 is $$V7 = V6 - 2(V6-V5).$$

It is seen from the foregoing that the insulating resistance 3 of the subscriber line 2 can be measured by an indication on the scale of the ammeter A of the test equipment 12 by leading the current corresponding to the voltage V7 obtained by the above equation from the test line 8 into the transistor 71 and the resistor 72 through the switches 40 and 44 when the subscriber line 2 is tested.

The circuit operation of FIG. 5 will be described. The relay switches 40 to 45 are set in a state as shown and the current Im1 is fed into the power source circuit 50 of the $V_B/2$ system. The voltage V5 caused by the current Im1 is produced across the resistor 70. The voltage V5 is digitized and stored in the register 83, through the filter 80, the relay switch 45, and the A/D converter circuit 81.

Then, the relay switches 41 and 42 are turned to the $V_B$ power source circuit 60 side. Then, the voltage corresponding to the current Im2 is produced across the resistor 70 and is then stored in the register 82 in the digital form. Then, the adder circuit 84 calculates the voltage difference (V6−V5) on the basis of the values V5 and V6 stored in the memory circuits 82 and 83.

Then, it is doubled by the doubling circuit 86 and the adder circuit 85 performs the calculation of V7, V7=V6−2 (V6−V5) by using the value V6 from the register 82 and the output value 2(V6−V5) from the doubling circuit 86, and stores the result of the calculation into the register 87.

Then, the relay switch 43 is switched to the transistor 71 side through the relay switch 44. Upon completion of the switching, the voltage corresponding to the current flowing into the transistor 71 and the resistor 72 through the resistor 70 is loaded into the memory circuit 82 through the A/D converter 81. The comparator 88 compares the voltage stored in the resistor circuit 82 with the voltage V7 previously stored in the register 87 by the comparator 88. The control circuit controls the base potential of the transistor 71 until the value in the register 82 is equal to the base potential of the transistor 71. At this time, since there is no external noise induced, the filter 80 is separated from its related circuit chain by opening the relay switch 45 at its poststage.

The base potential at the transistor 71 is controlled so that the values in the registers 82 and 87 are equal to each other, that is to say, the current corresponding to the gate current Ig flows into the transistor 71. Then, the relay switches 40 and 44 are switched to the opposite side. As a result, the current corresponding to the gate current Ig is shunted from the full current Im of the subscriber line 2 and is drawn into the compensation circuit, through the switches 40 and 44, the transistor 71, the resistor 72, and the battery, while only the current corresponding to the measuring current $I_L$ is fed into the test equipment 12. Therefore, the insulation resistance 3 of the subscriber line 2 can correctly be measured. As described above, according to the present invention, since the current corresponding to the gate current Ig is drawn into the compensation circuit by the constant current drawing circuit, the subscriber line test is possible free from the influence by the gate current Ig. Accordingly, it is possible to test the subscriber line as in the case of the prior test using the metallic contact. Therefore, the subscriber's circuit including the test leading-in switch can be fabricated into an monolithic IC, with the result that the subscriber's circuit is reduced in size and cost, while at the same time low power consumption and a high density package are realized.

As the result of fabricating the test switches by the use of electronic technology, the measuring time is also reduced.

Further, because of the feature allowing the test equipment to interface with the conventional subscriber line test equipment (LTF), the test equipment can test the subscriber lines in a centralized testing manner independently of the types of telephone exchanges used.

We claim:

1. A testing system for testing a subscriber line and a terminal equipment connected to the subscriber line with a connection of the testing system with the subscriber line through a switch, said testing system comprising:

a semiconductor switch of the type driven by a constant current for connecting a subscriber line to a test equipment through a test line; and a compensation circuit including means for measuring said constant current component of said semiconductor switch in a current flowing through said switch into said test line, and means for drawing said constant current component measured by said measuring means away from said test line so as to feed only the current except said constant current component to said test equipment via said test line.

2. A testing system according to claim 1, wherein said constant current measuring means includes means for comparing the potential on said test line with zero potential, and means for controlling the drawn current until the potential on said test line reaches zero potential.

3. A testing system according to claim 1, wherein said constant current measuring means includes means for measuring a potential of said test line by two kinds of measuring power sources the potentials are of which in a predetermined relation, means for storing the result of the measurement and means for measuring a constant current by arithmetically processing the value stored.

4. A testing system according to any one of claims 1 to 3, in which said means for drawing said constant current component includes a constant current circuit.

5. A testing system according to claim 3, in which said predetermined relation of potentials in said measuring power sources is defined by the ratio 1:2.

6. A testing system for testing a subscriber line, comprising:
    a plurality of subscriber lines each connecting a terminal equipment;
    semiconductor switches each driven by a constant current and selected for connecting a desired one of said subscriber lines to be tested to a test equipment through a test line;
    means for measuring the constant current component of a selected semiconductor switch in a current flowing through said selected one of said semiconductor switches into said test line; and
    means for drawing the constant current component measured by said measuring means away from said test line to feed the current component except said constant current component to said test equipment via said test line.

7. A testing system according to claim 6, further comprising a test network for selecting a desired one of a plurality of test lines connected to said semiconductor switches and leading the selected test line to said test equipment.

8. A testing system according to claim 6, wherein said constant current measuring means includes means for comparing the potential on said test line with zero potential, and means for controlling the drawn current until the potential on said test line reaches zero potential.

9. A testing system according to claim 6, wherein said constant current measuring means includes means for measuring a potential of said test line by two kinds of measuring power sources the potentials of which are in a predetermined relation, means for storing the result of the measurement and means for measuring a constant current by arithmatically processing the value stored.

10. A testing system according to claim 6, in which said means for drawing said constant current component includes a constant current circuit.

11. A testing system according to claim 6, in which said predetermined relation of potentials in said measuring power sources is defined by the ratio 1:2.

12. A testing system according to claim 8, wherein said means for controlling the draw current includes;
    means for successively generating a control signal for stepwise increasing the drawn current at a predetermined timing and another control signal for stepwise decreasing the drawn current at a predetermined timing, means for selecting one of said control signals at said predetermined timing in accordance with the compared result of said comparing means, and
    means for adding said selected control signal to a control signal set at the former timing and for storing said added signal.

* * * * *